(12) United States Patent
Kaun

(10) Patent No.: US 8,734,983 B2
(45) Date of Patent: May 27, 2014

(54) HOUSING FOR ELECTROCHEMICAL DEVICES

(75) Inventor: Thomas D. Kaun, New Lenox, IL (US)

(73) Assignee: Inventek Corporation, New Lenox, IL (US)

( * ) Notice: Subject to any disclaimer, the term of this patent is extended or adjusted under 35 U.S.C. 154(b) by 2185 days.

(21) Appl. No.: 11/104,363

(22) Filed: Apr. 12, 2005

(65) Prior Publication Data

US 2005/0233212 A1  Oct. 20, 2005

Related U.S. Application Data

(60) Provisional application No. 60/562,157, filed on Apr. 14, 2004.

(51) Int. Cl.
*H01M 2/36* (2006.01)
*H01M 2/08* (2006.01)
*H01M 10/50* (2006.01)
*H01M 2/02* (2006.01)

(52) U.S. Cl.
USPC ............. 429/185; 429/94; 429/120; 429/177

(58) Field of Classification Search
CPC ............ H01M 2/0222; H01M 2/0227; H01M 2/0443; H01M 2/0465; H01M 2/1038
USPC ............. 429/97, 163, 173, 94, 120, 164, 177, 429/189
See application file for complete search history.

(56) References Cited

U.S. PATENT DOCUMENTS

| 3,223,555 A | * | 12/1965 | Solomon et al. ............. 429/129 |
| 4,048,397 A | | 9/1977 | Rothbauer |
| 4,322,484 A | | 3/1982 | Sugalski |
| 5,219,673 A | | 6/1993 | Kaun |
| 5,567,544 A | | 10/1996 | Lyman |
| 5,593,462 A | | 1/1997 | Gueguen et al. |
| 5,757,090 A | | 5/1998 | Kirjavainen |
| 6,017,410 A | | 1/2000 | Baccini |
| 6,087,035 A | | 7/2000 | Rogers et al. |
| 6,218,042 B1 | * | 4/2001 | Naudet et al. .................... 429/97 |

(Continued)

FOREIGN PATENT DOCUMENTS

| DE | EP0588279 | * | 3/1994 | ............. H01M 2/10 |
| EP | 0 771 040 A2 | | 2/1997 | |
| JP | 10-308206 | | 11/1998 | |
| JP | 20000090965 A | | 3/2000 | |

OTHER PUBLICATIONS http://dictionary.reference.com/browse/seal, item 17.*
http://dictionary.reference.com/browse/seal, [retrieved on Nov. 14, 2013], item 17.*

(Continued)

*Primary Examiner* — Helen O Conley
(74) *Attorney, Agent, or Firm* — Cherskov Flaynik & Gurda LLC

(57) ABSTRACT

An improved housing for a rolled-ribbon electrochemical device is provided. The housing comprises a fastener that aligns first and second cups during assembly and maintains electrode contact independent of external pressure on the housing eliminating the possibility of an open circuit state for a cell. In one alternative embodiment, the fastener comprises a stem that fits into a hollow tube and resists detachment from the tube. In another alternative embodiment, the fastener comprises a stem that fits into a grommet and resists detachment from the grommet. In yet another alternative embodiment, the fastener comprises a tube that fits into a grommet and resists detachment from the grommet.

29 Claims, 10 Drawing Sheets

(56) References Cited

U.S. PATENT DOCUMENTS 6,524,739 B1 * 2/2003 Iwaizono et al. ............... 429/61
6,730,438 B2   5/2004 Nakanishi et al.
7,118,823 B2 * 10/2006 Kato et al. .................... 429/38

OTHER PUBLICATIONS

Kaun, Thomas D. and Harris, Will G., "Disc-Shaped, Li-ion Cells for High-Rate Applications", Proc. of the 40th Power Sources Symposium, p. 387 (2002).

* cited by examiner

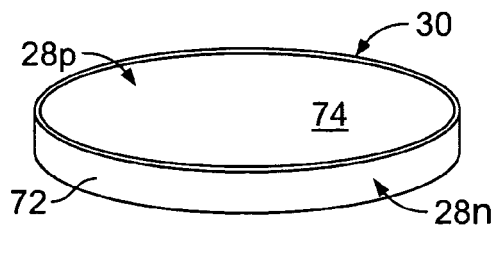 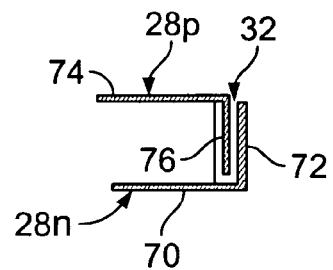
FIG. 7A　　　　　　　　FIG. 7B
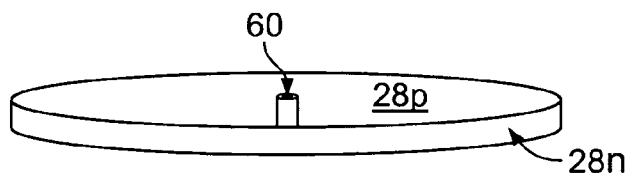
FIG. 7C
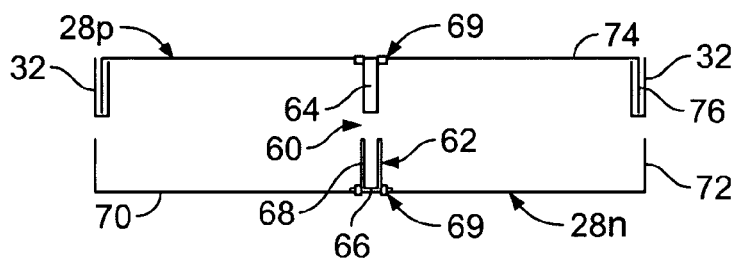
FIG. 7D
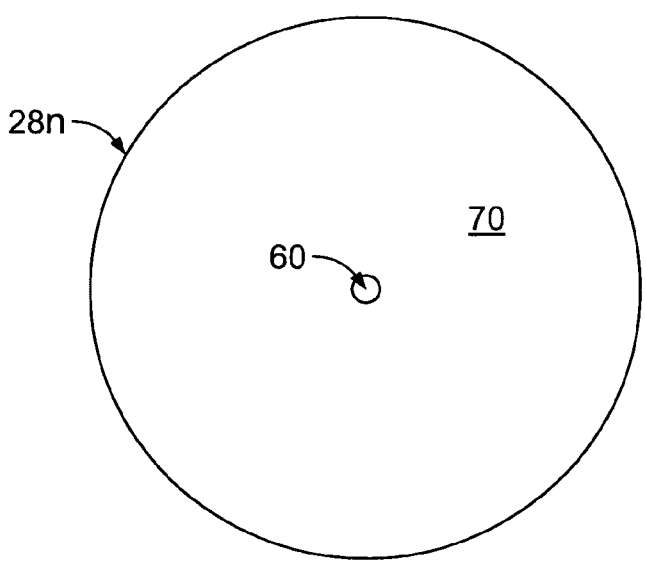
FIG. 8

HOUSING FOR ELECTROCHEMICAL DEVICES

This invention was made with government support under Contract No. DMI-0349621 awarded to the National Science Foundation. The Government has certain rights in this invention.

CROSS-REFERENCE TO RELATED PATENT APPLICATIONS

This application is an application claiming the benefit under 35 USC 119(e) U.S. Application 60/562,157, filed Apr. 14, 2004, incorporated herein by reference in its entirety.

FIELD OF THE INVENTION

The present invention relates to improved electrochemical devices, such as batteries, capacitors, fuel cells, sensors or the like. More specifically this invention relates to improved housings for electrochemical devices that provide high specific power and energy outputs per weight and volume of the device.

BACKGROUND OF THE INVENTION

With the increasing pace of advances in electronics there has been a corresponding increase in the need for electrochemical devices that safely and efficiently provide sufficient energy density to power advanced electronic devices, especially portable electronic devices, while still being economically viable. Older battery configurations are often unsuitable to meet these increased demands. Out of environmental and efficiency concerns, the reach of electricity providing devices has been expanded to new areas including hybrid electric vehicles. Ideally, an electrochemical device will provide high current density, decrease the internal resistance of the battery, and effectively manage the thermal output of the electrochemical device to increase the longevity of the device. These features can be achieved by providing massive and/or large surface-area connections between electrodes and cell current collectors, and specifically between cells in a battery.

A second important feature of the high power device is internal heat removal. Thermal management is important to the long life of Li-ion batteries in retaining battery capacity particularly due to electrolyte degradation. High power to external circuitry generally generates a like amount of energy as heat over a short time duration and internal to the cell. Excessive temperatures will destroy (e.g. melt the microporous polymer separator or autoignite the flammable organic electrolyte) or significantly shorten the useful life of the Li-ion cell. Under high pulse power, heat is generated at the electrode/separator interface due to limited ionic conduction. For the conventional jelly-rolled cell, the most direct path for heat loss is across the layers of heat sensitive microporous polymer. Excessive temperature within the cell will locally shutdown the microporous polymer resulting in still higher temperatures possibly leading to the auto-ignition of the organic electrolyte.

An electrochemical device comprised of cathode and anode electrodes physically exposed to an electrolyte can generically be used to convert between chemical and electrical energies. A housing can enclose these electrode and electrolyte components, and can even seal them from the atmosphere. Batteries, fuel cells, and capacitors are but a few such specific electrochemical devices to which this invention relates.

As the electrical power in terms of voltage and/or amperage of each pair of cathode and anode electrodes (or cell) is generally small, many separate pairs of cathode and anode electrodes or cells can be used in a single housing. Current collectors are generally used to electrically interconnect the cells, in parallel and/or in series, to provide usable voltage and amperage outputs at exposed terminals on the electrochemical device.

The electrochemical device performs usable work when ions pass between the electrodes of each cell via the electrolyte, and when electrons concurrently pass through each cell via the electrodes. The generated voltage per cell is predetermined by the electrochemical reaction of the component materials used, and the generated amperage and/or power available is dependent on the configurations and masses of these active components.

The specific output energy of the device can be provided in terms of watts-hours per device weight, and the specific output power of the device can be provided in terms of watts per device weight. Output values of existing electrochemical devices are typically small fractions of theoretically possible output values because of internal resistances and other inefficiencies (hardware mass and volume).

The resistance to ion conduction between the electrode elements is one major source for internal power loss. Such resistance, R, can be theoretically determined with the expression $$R=\rho l/A.$$

where:

"ρ" (rho) is the impedance value of the electrolyte;
"l" is the thickness of the electrolyte; and
"A" is the interfacial contact area between the electrode elements and electrolyte.

The ionic-impedance value, $\rho$, is not easily subject to modification and is not effective as a design parameter. Designers of electrochemical devices thus strive to reduce the electrolyte thickness "l", and to increase the interfacial contact area "A" between the electrode elements and the electrolyte.

Different configurations of the cathode and anode electrodes, of electrolyte separation, and of current collection have been proposed. For example, a cathode electrode band can be zig-zagged to define separate compartments for holding the electrolyte, and inserted with elongated rod-like anode electrodes into the electrolyte spaced from the cathode electrode. The interfacial contact area "A" effectively is less than the overall surface area of the anode rods, as some rods oppose one another rather than the cathode.

Also, a zig-zagged, folded separator band can define opposing compartments for holding and isolating plate-like cathode and anode electrodes, with electrolyte engulfing all of these components. In an alternative design, each cell can be formed with C-shaped electrodes and a Z-shaped separator sandwiched therebetween. Alternatively, a separator band having electrically conductive surfaces can be folded and sandwiched between separate sets of respective plate-like cathode and anode electrodes placed between the separate oppositely facing folds. A "jellyroll" cell can be formed by coiling a preformed assembly of cathode and anode electrodes and a separator on itself to yield a cylindrically shaped electrochemical device, wherein the face-to-face electrodes and sandwiched electrolyte and separator structures increase the interfacial contact area "A" between the electrodes. However, the very breadth of the facing electrodes and sandwiched electrolyte and separator raise another issue, namely the sufficiency of the structure in maintaining and in supporting the electrode elements physically separate during assembly and during operation. This includes withstanding thermal expansion and contraction forces of the cell components during operational temperature changes. Increasing the thickness of the sandwiched electrolyte and separator to provide needed strength and/or durability also increases the ion-conducting electrolyte thickness "I", offsetting benefits obtained by increased interfacial contact area "A".

Current collectors used in these cell arrangements add significant weight, and thus reduced specific cell energy and power outputs. For example, isolated conductors are generally connected to the electrodes and routed along extended paths independently of the electrodes to the external terminals. These conductors should carry the full cell current, and thus should be of sufficient mass and cross-section to keep internal resistance manageably low. For a typical battery design of connected terminals, electrode tab/current collector/cell terminal resistance/battery terminal resistance can account for a 50% reduction in battery power output from theoretical capability. Generally, massive connectors are used to avoid power loss for high powered batteries.

Additionally, these cell arrangements provide electrodes of limited size and/or thickness, limiting the quantities of usable electrode materials, and thus, limiting maximum cell storage energy and/or operating cycle-life, particularly for rechargeable cells.

The dilemma of these designs is that power gains obtained by increasing the interfacial electrode area "A" across the electrolyte generally are typically offset by increased electrolyte thickness "I" and that the weight and volume of the current collectors reduce specific energy and power outputs. Power can be increased, but only at the expense of reduced energy storage capacity per weight and volume and at increased cost due to needed additional hardware. High interfacial area "A" of the spirally wound "jellyroll" configuration merely trades off usable power against the energy density because a minimum separator thickness is needed for cell durability and cycle-life. Existing bipolar cell arrangements do not escape this power and energy trade off dilemma; nor do fuel cell electrochemical devices.

The rolled-ribbon cell technology disclosed in U.S. Pat. No. 5,219,673 has made great strides towards achieving enhanced power density for electrochemical devices. Specifically applied to Li/organic-based electrolyte chemistries, improved batteries are formed using stackable disk-shaped cells to realize near optimum power capability from the cells. Further objectives of batteries for high-pulse power requirements, such as for hybrid electric vehicles and for power tools, are to continue to reduce battery cost and to increase durability. These Li/organic-based electrolyte battery chemistries, although exhibiting quite high voltages (3-5 volts), have relatively low current density capabilities. One limiting factor is the attempted use of relatively-thin components, i.e. the electrode and separator layers. A practical device generally, requires a lot of active area. For example, with peak current density of 10 mA/cm$^2$, it can require 1000 cm$^2$ active area to achieve 10 A. For hybrid electric vehicles, the current is on the order of 100 A at 200-400 volts (equivalent to 20-40 kW).

Thus, a further dilemma is the large number of small cells that form such batteries. Internal heat generation resulting from the large numbers of small cells (e.g. 1 Ampere-hour (Ah) capacity uses 18,650 cells) is a major power loss source. More recently, larger cells (10 Ah) have used a prismatic configuration. These cells have broad electrodes with multiple tabs connected to a traditional terminal connection. These prismatic cells are hard-wired together (terminal-to-terminal) in a rectangular box. Nonetheless, this arrangement of substantially larger cells can still sacrifice 50% of the theoretical power of the cell chemistry. Thus, there is a continuing and persistent need for electrochemical devices which have high energy density, provide high power output, and approach the theoretical limit for electrical power output.

A Li/organic-based electrolyte battery for high power applications, such as for hybrid electric vehicles, should also incorporate features to enhance safety and battery longevity. Because there is internal gas pressure generated during battery operation and during battery degradation conditions, there needs to be non-catastrophic, cost effective means to relieve the gas pressure. The typical means is to include a rupture disc on the housing of the Li-ion cell. Rupture of a disc housing causes irreversible failure of that battery, and, if a disc ruptures, electrolyte may escape to further degrade the battery. Additionally, because the electrolyte batteries often operate in environments that cause both shock to and vibration of the battery, the battery should be durable.

SUMMARY OF THE INVENTION

An embodiment of the present invention provides a housing for an electrochemical device comprising a first cup, a second cup, a fastener, and a gasket. The first cup may include a first plate having a circumferential edge and a first wall, the first wall extending from the first plate along the circumferential edge. The second cup may include a second plate having a circumferential edge and a second wall, the second wall extending from the second plate along the circumferential edge, wherein the first cup fits together with the second cup thereby creating an enclosure. The fastener may include a threaded stem made of conducting material and extending from the center of the first plate in the same general direction as the first wall and a hollow tube made of insulating material and extending from the center of the second plate in the same general direction as the second wall, wherein the threaded stem fits inside the hollow tube and assists in holding the second cup together with the first cup. The gasket may be made of plastic material that fits over the first wall wherein the gasket electrically isolates the first cup from the second cup and seals the enclosure from the ambient atmosphere surrounding the housing.

Certain embodiments of the present invention are found in the following paragraphs:

The present invention provides a housing for an electrochemical device comprising a first cup, the first cup comprising a first plate having a circumferential edge; and a first wall, the first wall extending from the first plate along the circumferential edge; a second cup, the second cup comprising a second plate having a circumferential edge; and a second wall, the second wall extending from the second plate along the circumferential edge, wherein the first cup and the second cup are capable of fitting together thereby creating an enclosure; and a fastener, wherein the fastener attaches the first cup to the second cup.

In one embodiment of the previously described housing, the fastener comprises one or more stems; and one or more tubes, wherein the one or more stems fit inside one or more of the one or more tubes.

Also provided is the fastener of the previous paragraph, wherein one or more of the one or more tubes and the one or more stems at least partially comprises an insulating material.

The present invention also provides the fastener of the previous paragraph, wherein the insulating material comprises a plastic material.

Also provided is the fastener as previously described, wherein one or more of the one or more tubes and the one or more stems at least partially comprises a conducting material.

Further provided is the fastener of the previous paragraph, wherein the conducting material comprises a metal.

Also provided is a fastener in which one or more of the one or more stems and the one or more tubes is threaded.

In another embodiment of the housing as previously described, the fastener comprises a grommet; and a tube, wherein the tube fits inside the grommet and is attached thereto.

The invention also provides a fastener in which one or more of the grommet and the tube is at least partially comprised of an insulating material.

Further provided is a fastener of the previous paragraph, wherein the insulating material comprises a plastic material.

The invention also provides a fastener as described in the alternate embodiment in which one or more of the grommet and the tube is at least partially comprised of a conducting material.

Also provided is the fastener of the previous paragraph, wherein the conducting material comprises a metal.

The invention further provides the alternate embodiment of the fastener wherein the tube is hollow and includes a side channel to an interior of the electrochemical device, thereby allowing gases to escape.

The invention also provides an embodiment of the fastener in which one or more of the tube and the grommet is threaded.

In yet another embodiment, the housing further comprises a gasket wherein the gasket electrically isolates the upper cup from the lower cup.

Also provided is a gasket comprised of a plastic material.

Further provided is a gasket that fits over one or more of the wall of the first cup and the wall of the second cup.

The present invention also provides an embodiment of the housing in which the first cup and the second cup comprise the same material.

The present invention also provides a housing further comprising an electrode assembly comprising: a positive electrode layer wherein the positive electrode layer is electrically coupled to one of the first cup and the second cup; a negative electrode layer wherein the negative electrode layer is electrically coupled to the other of the first cup or the second cup; and a separation layer, wherein the positive electrode layer, the separation layer, and the negative electrode layer are wound around a central axis forming a coil of alternating electrode and separation layers such that the separation layer prevents direct contact between the positive electrode layer and the negative electrode layer; and an electrolyte adjacent to the electrode assembly and enclosed within the enclosure.

Other principal features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals will denote like elements.

FIG. 7A depicts the housing for the electrochemical device in accordance with an exemplary embodiment; FIG. 7B depicts a cross-sectional view of the peripheral seal area of the housing for the electrochemical device including the 'U' shaped polymeric gasket; FIG. 7C depicts the outer pan of the housing for the electrochemical device including the center fastener, polymeric tube; FIG. 7D depicts a cross-sectional view of the housing for the electrochemical device including the 'U' shaped polymeric gasket and the threaded stem and plastic tube fastener.

FIG. 8 depicts a radial view of the housing for the electrochemical device including a fastener in accordance with an exemplary embodiment.

DETAILED DESCRIPTION OF THE INVENTION

Figure 1:
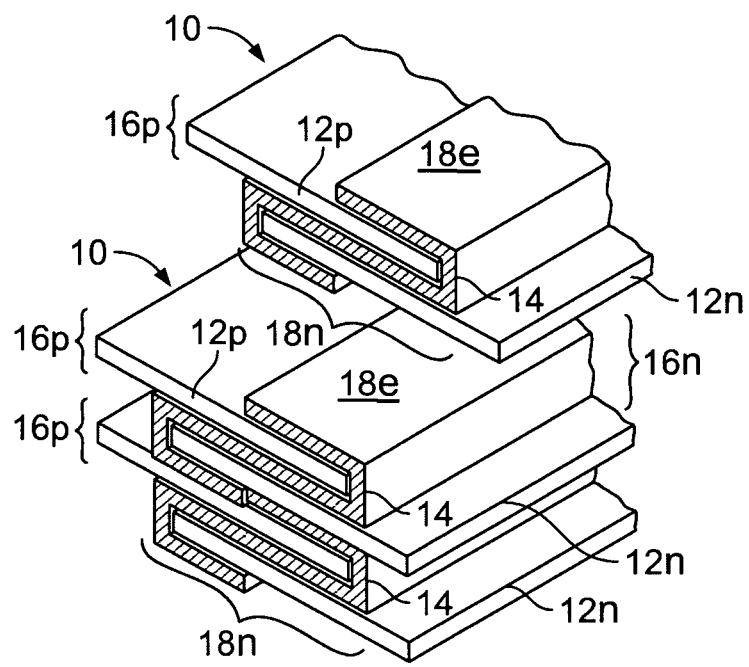
FIG. 1 is a cut-away perspective view of the electrode/separation layer configuration in the electrode assembly in accordance with an exemplary embodiment.

Exemplary embodiments described herein provide an improved cell arrangement involving the orientation of positive and negative electrodes (as depicted in the drawings throughout and referred to as e.g. 28$p$, 22$p$, etc.), interpositioned separator and/or electrolyte, and current collectors. The improved cell uses an electrode assembly with laminated electrode/foils comprised of alternately arranged, generally parallel, positive and negative electrodes, and a separator layer and/or electrolyte formed of a very thin ionic-conductive ribbon-like layer configured in a tight serpentine manner and physically interposed between the electrodes. This basic laminate cell preassembly is layered on itself, such as by winding or coiling it in a spiral to form an electrode assembly in the general shape of a flat disc (wherein the diameter is preferably greater than twice the thickness of the disk). The cell membrane is sandwiched between plate-like current collectors with the electrode interfaces primarily perpendicular to the current collectors to make up an electrochemical cell.

Because of the expense of lithium ion batteries, which also provide the greatest electrochemical potential and largest energy content, the rolled-ribbon cell configuration has particular utility for cells employing lithium/organic electrolyte cell chemistry, although the present invention is also well suited to other cell chemistries, including, but not limited to, nickel/metal hydride and alkaline electrolyte systems. Of particular interest, the technology provides high pulse power devices at reduced costs and with excellent thermal management producing kW levels of power.

The improved cell arrangement in an exemplary embodiment uses a ribbon-like cell assembly with coated foil electrode strips extending beyond the edge of the folded separator when viewed in cross section. The extended electrode areas can have less or no active electrode material, and the electrode ribbons are preferably cored with metal foils or other electron conducting material e.g. carbon paper and/or electrically conductive polymer. For a 5 inch diameter cell, 100 to 250 ft of electrode edge contact with a cell housing is typically achieved.

The exemplary embodiments provide for adding electrode material or cell capacity by way of extending the electrode strips beyond the separation layer. Instead of having electrode discs applied to the major faces of the rolled-ribbon cell or cell separator membrane, as in earlier button type electrochemical cells, the electrode extensions define reservoirs of electrode material. These extensions are subsequently compacted into a disc as the cell is assembled into the disc housing hardware.

The exemplary embodiments also provide for a separator ribbon configuration in which the folds of the separation layer are oriented up and down at each edge. This arrangement serves to align the electrode ribbons with respect to the separator and helps to ensure the positioning of the electrodes and separator during the cell winding operation. This alignment aids in forming a flat disc cell.

The exemplary embodiments can provide an electronic component that can serve to electrically remove a shorted or defective cell. Preferably the electronic component is embedded within the cell and resides at the center hub of the cell for ease of manufacture, for example by initiating the cell winding. In a preferred embodiment, a diode is utilized for removing (or short-circuiting) the non-operative cell. Similarly, the component can act to bypass current at overcharge or excessive voltage conditions.

The invention also provides a button-type cell housing. The housing comprises two opposing shallow cups, a first cup and a second cup, that are electrically isolated from each other using a polymeric "U" shaped gasket. Each cup comprises an essentially flat surface surrounded by a wall that extends from the flat surface or plate creating a receptacle or enclosure for holding the electrode assembly. The gasket extends along at least a portion of the wall of one of the two opposing cups. The first and second cups fit together, one within the other, to create an enclosure for holding the electrode assembly. The gasket further forms a gas-tight seal for the interior contents of the cell. In an exemplary embodiment, the gasket is insert molded to one of the cups. Forming the gasket with an integral plastic seal such as by using insert molded plastic for the gasket improves the quality of the cell and reduces the cost of assembling the cell.

The cups interface with the perpendicular electrode member of another electrochemical cell to serve as both a current collector and a cell terminal. One cup acts as a positive terminal and the other cup acts as a negative terminal and, together with the electrode assembly, the cups form a cell. The positive electrode substrate can be made of essentially the same material as the surface of the positive terminal, and the negative electrode substrate can be made of essentially the same material as the surface of the negative terminal. In some embodiments, the positive terminal and positive electrode substrate are generally made of aluminum, and the negative terminal and negative electrode substrate are generally made of copper. To increase durability in response to temperature change, the same metal material can be used to form a substrate for both the positive and negative terminals. In an exemplary embodiment, the substrate material can be carbon steel. Thus, in an exemplary embodiment, the positive electrode substrate and positive terminal are made of aluminized carbon steel, and the negative electrode substrate and negative terminal are made of copper plated carbon steel. The present embodiments can use thinner, lighter gauge metals (for example 10-15 mm thick versus 20-30 mm thick) for the cups, which reduces the weight and volume of the electrochemical device. This configuration also reduces the dependency on a flat, stiff cup to ensure that the electrode adequately contacts the appropriate cup surface.

In exemplary embodiments, the housing for the electrode assembly further comprises a fastener that aligns the first and second cups during assembly and maintains electrode contact with the appropriate cup independent of external pressure on the housing, helping to eliminate the possibility of an open circuit state for a cell. In an exemplary embodiment, the fastener comprises two components. The first component can be molded or attached to the plate of one cup, and the second component can be molded or attached to the plate of the opposing cup so that either of the first or second components fits into the other when the first and second cups are pushed together to form a receptacle or enclosure. The joined first and second components of the fastener thereafter resist detachment from each other thereby holding the first and second cups together. In one alternative embodiment, the fastener comprises a stem that fits into a hollow tube. In another alternative embodiment, the fastener comprises a stem that fits into a grommet. In yet another alternative embodiment, the fastener comprises a tube that fits into a grommet. Other fastener components may be used for holding the first and second cups together as in known to those skilled in the art. As will be apparent, the fastener can be comprised of one, two, three, or more separate components as desired. For example, a single hollow tube can attach to stems on the separate cups, some or all of which can be threaded.

In an exemplary embodiment, the fastener components are attached at or near the center of the interior surface of each plate of the cups so that the component extends from the plate in generally the same direction as the wall. Alternatively, the fastener components may be attached at other locations on the interior surface of each plate. In other alternatives, the fastener components may be attached to either the interior or the exterior surface of the cup walls. The fastener components may be attached, molded, or formed with the cup surfaces using various methods known to those skilled in the art.

At least one of the two fastener components is at least partially made of insulating material, such as plastic polyethylene, polypropylene, Dupont Surlyn, so that the cups are held together to create a fixed internal dimension without conducting electricity across the fastener. In an exemplary embodiment, fastener components made of insulating material can be insert molded to the metal surface of the cup as can any seal or gasket that separates the cups. The second fastener component can be made at least partially of either insulating or conducting material. A metal material can be a suitable conducting material for making the second fastener component. Generally, the fastener should be devised such that electric current is not allowed to pass through the fastener. In combination with the gasket, the fastener holds the housing, including the enclosed electrode assembly, together independent of the external pressure on the housing thereby providing consistent contact between the cups and the electrodes. As shown in FIG. 7D, the center fastener is comprised of pressing a threaded metal stem 64 into a plastic tube 68. As a result, the fastener improves cell durability in response to shock and vibration. In exemplary embodiments, the fastener is located at the center hub of each cup, although the position of the fastener is not particularly limited, and the fastener can be located anywhere on the cup, including off-center, on an edge of the cup or the like.

The first cup of a first cell is adjacent to the second cup of a second cell and the adjacent cups have opposite polarities. For example, if the first cup of the first cell is positive, the second cup of the second cell is negative. In exemplary embodiments, the fastener can further act as a diode by shorting the cell and effectively removing the cell from the battery when the voltage level generated by that cell drops below a predefined value, for example, 0 volts. As a result, a non-operative cell is removed from the battery without causing a failure of the entire battery. As shown in FIG. 7D, a diode 69, a two lead electronic component, has one lead attached to metal cup 28n piercing the base of plastic tube 68 and the other lead piercing the metal cup 28p contacting the stem 64 to thus electronically-bridge metal cups 28n and 28p when the two cups enclose the cell.

Figure 10A:
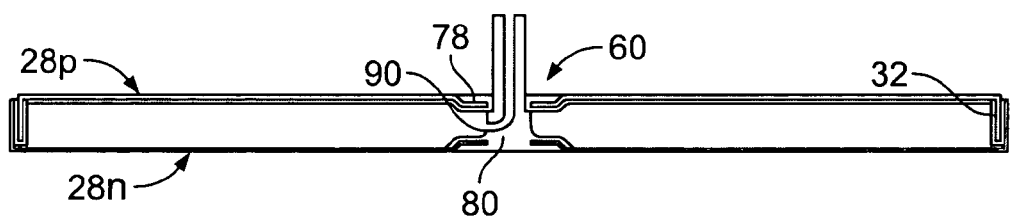
FIG. 10A depicts a cross sectional view of the housing for the electrochemical device showing a fastener including a plastic tube and grommet.
Figure 10B:
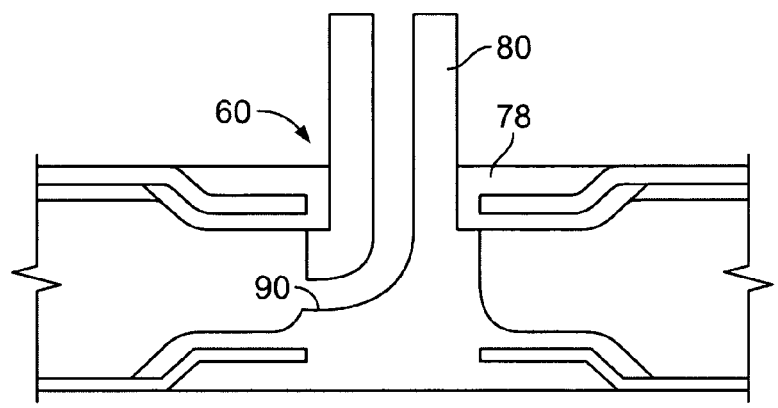
FIG. 10B depicts a cross sectional view of the housing for the electrochemical device showing a fastener including a plastic tube and grommet along with a detailed cross sectional view of the fastener and a cut away radial view of the housing with the fastener.
Figure 10C:
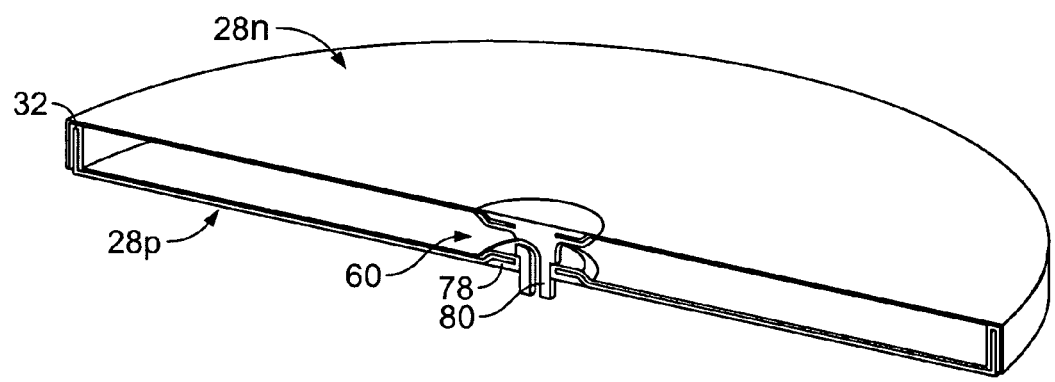
FIG. 10C depicts a pictorial cross sectional view of the housing for the electrochemical device showing a fastener including a plastic tube and grommet along with a detailed cross sectional view of the fastener.

In exemplary embodiments, the fastener further operates as a fill tube that allows for the electrochemical device to be filled with an electrolyte. By including a radial hole to the inside of the cell, the fill tube can be an integrated vent and electrolyte fill port, although the fill port and vent can be separate features. The fill tube can act as a vent during cell formation by allowing trapped gas to exit from the housing as the cups enclosing the electrode assembly are pushed together to form the cell. The fill tube can also act as a fill port during the electrical charge of the cell by injecting the electrolyte into the housing surrounding the electrodes. FIGS. 10A-10C shows the fastener also operating as a vent and/or fill tube through the radial hole 90 with passage to cell interior.

The exemplary embodiments also provide a high voltage and high capacity battery by stacking a plurality of button-type cells together. The cells are typically connected in series. Control of internal gas pressure and maintenance of contact pressure between the button cell in the stack can further be accomplished with active pressure, such as a Belleville spring washer. The specified limit for internal pressure is handled by release via the peripheral gasket which can reseal after an event.

The exemplary embodiments also provide for an augmentation of passive thermal management of the high power battery by manifolding cooling fluid about the battery stack and between the disc-shaped cells. A thermostated control pumps the fluid to external cooling such as to a radiator or to a small refrigeration unit. The cell hardware cups of the button-type battery enclosures conduct heat from the electrode/separator interface. Further, via flow passages between the faces of the button cells, a more direct removal of heat is achieved.

The exemplary embodiments also provide a method of making the improved cell and its electrochemical devices.

A rolled-ribbon cell configuration according to the present invention can release close to 100% of theoretical power of the Li/organic electrolyte cell chemistry in substantially larger cells of 5-10 Ah capacity with pulse currents of 100-200 A from a single cell. Further, these stackable cells, preferably having 125 $cm^2$ diameter intercell contact or more, can deliver the power at the battery level from the battery terminals. Moreover, effective use of a given amount of costly lithiated Ni/Co oxide electrode/electrolyte materials can produce a significant cost advantage and advantages in thermal management. The rolled-ribbon cell used inside a stackable disk cell housing will promote longevity of these costly battery materials. Unlike the prismatic, jelly-rolled cells, internally generated heat from the rolled-ribbon cell can be drawn out from the cell via short conduction paths without crossing the heat sensitive microporous polyethylene/polypropylene separator. Accordingly, the present cells can be operated without the need for active thermal management.

The enlarged cut-away perspective view of FIG. 1 illustrates a cell preassembly 10 suited for forming an electrochemical device such as a battery, fuel cell, sensor, or capacitor. The cell preassembly 10 specifically includes alternatively arranged generally parallel positive electrode 12p and negative electrode 12n, and a separator or electrolyte layer 14 interposed therebetween somewhat in the form of a laminate structure. In this disclosure, the terms anode and cathode will also be used for the electrodes, somewhat interchangeably, as well as the terms separator and/or electrolyte. In the illustrated electrochemical battery device, the separator/electrolyte 14 is of an ionic conductive material; the positive and negative electrodes 12p and 12n are of both ionic and electronic conductive materials; and the terminals of the cell are of electronic-conductive material. The actual materials of these components can depend on the type of electrochemical battery. The electrodes are generally metal foils coated with particles of the active electrode material. Examples of suitable electrodes include without limitation, 10 micron Al or Cu metal foils that can facilitate low cell-resistance and heat removal. Due to the configuration of the present cells, i.e. their short path length, other materials can be utilized, such as carbon fiber material which generally has lower conductivity than metal foil. Preferred materials for the cathode are lithiated metal oxides while preferred materials for the anode are carbon and/or graphite.

Both electrodes can consist of high surface area powders that are held in a 8 percent by weight (wt %) PVDF (polyvinylidene fluoride, e.g. Kynar 720 from Elf Atochem, USA) binder matrix. The positive electrode also contains 8 wt % carbon black (e.g. mesocarbon microbeads (MCMB) or C-Black) for electrical conductivity. Both electrodes are applied as a slurry to the metal foils (typically 10 micron thick copper foil for the negative electrode and 25 micron thick aluminum foil for the positive electrode) which after drying adheres as porous layers (50 micron thick each side) held together by PVDF binder and is later infiltrated with the electrolyte. For the Li-ion cell chemistry, there are two major types of cathode material: Lithium Nickel-Cobalt Doped Oxide and Lithium Manganese Oxide Spinel. Both compositions are available from FMC Corp. Lithium Div. Gastonia, N.C. 28054 as Lectro Plus 600 and Lectro Plus 300, respectively. The preferred composition is $LiNi_x Co_y M_z O_2$ where Nix is $0.6<x<0.8$, Coy is $0.1<y<0.3$, and M (e.g. Al) z is $0.05<z<0.1$. The composition $LiMn_2O_4$ is where 2 Li:Mn ratio is 1.02-1.06:1.

The separator 14 is typically a microporous polymer film that maintains physical integrity after undergoing the mechanical manipulations to form the cell preassembly 10. Preferably, separator 14 is a polyethylene/polypropylene film known as CELGARD® 2300 and CELGARD® 2400 (Celgard LLC, Charlotte, N.C.), polymeric film known as NAFION® (Dow Chemical Company, St. Louis, Mo.), or polyethylene oxide with lithium bis-trifluoromethanesulfate amide (Sigma-Aldrich, Milwaukee, Wis.). As can be seen in FIG. 1, the positive and negative electrodes 12p and 12n extend beyond the edge of the separator layer 14. Preferably, the electrodes extend beyond the edge of the separator layer 0.1 to 1.0 mm, particularly 0.5 to 1.0 mm, or more. One skilled in the art will readily be able to determine the preferred length that the electrodes should extend beyond the separator layer based on a number of factors including electrode thickness, separator thickness, and the physical properties of the cell.

A cross-section of the cell preassembly 10 shows that the cell preassembly has opposing sides 16p and 16n, and opposing sides 18e and 18n. The negative electrode 12n extends to and along the sides 16n and 18n, the positive electrode 12p extends to and along the cup of the side 16p, and the separator or electrolyte 14 defines the entire side 18e and completes the remainder of the sides 16n, 18n and 16p. The cell preassembly 10, with this cross-section, can be elongated indefinitely.

The cell preassembly and/or cell membrane can be formed by adapting otherwise conventional techniques. The materials for the electrodes or separator/electrolyte can be available in a flexible or pliable form to extrude and to wind as thin ribbons. The component material of the electrodes can also be available as a liquid, or as a powder to be mixed and fluidized with a binder/solvent system that can be extruded or selectively tape cast or painted by stencil where needed. Powders can be very fine (1-10 micron size) and when mixed can make up 60-90% by weight of the mixture with the binder/solvent making up the balance (preferably about 20%). Binders can be selected from a group including polyvinyl alcohol, PVDF (polyvinylidine fluoride polymer), or thermal setting resin, e.g. polyisobutylene that can decompose by depolymerization. A plasticizer, such as butyl benzol thalate, can also be added to allow the material to be mechanically worked (rolled, corrugated, extruded) at low temperatures.

Figure 2:
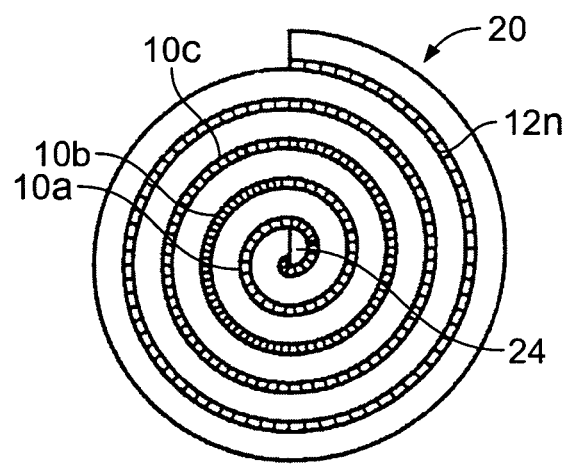
FIG. 2 is a right side facial view showing the electrode assembly of FIG. 1 coiled on itself to define a rolled-ribbon cell (laminate cell membrane) of the type suited for forming an electrochemical device in accordance with an exemplary embodiment.

A cell preassembly 10 can be coiled upon itself about a center core 24 to produce successive layers 10a, 10b, and 10c of a rolled-ribbon cell. FIG. 2 is a right side facial view showing the electrode assembly 22 coiled on itself to define a rolled-ribbon cell (laminate cell membrane) of the type suited for forming an electrochemical device according to exemplary embodiments.

Figure 3:
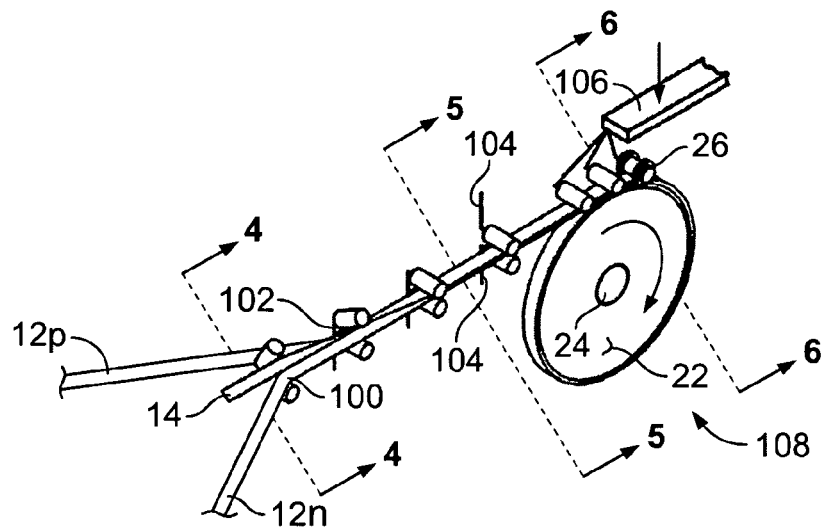
FIG. 3 depicts the process for making the electrode/separator assembly in accordance with an exemplary embodiment.

For example, the electrode ribbons in FIG. 3 are usually metal foil ribbons that have been coated with a thin uniform layer (25 to 100 micron thick) of active electrode particulate (~400 U.S. mesh). The electrode particulates are held in a matrix of PVDF. The electrode is prepared as a paint-like mixture having about 8 wt % PVDF dissolved in NMP (1-methyl-2-pyrrolidinone). The electrode mix is typically applied by doctor-blade. Controlled drying removes the NMP leaving behind the electrode particles attached to the foil by the PVDF binder. The completed electrode ribbons are handled in a dry room atmosphere through cell winding and assembly into the button-like, peripherally sealed (airtight) enclosures for each cell.

Forming of the cell preassembly 10, in an exemplary embodiment, can be performed as depicted in FIG. 3 by folding a strip of separator 14 into the shape of a Z, and sliding the electrodes 12p and 12n into opposite folds of the separator 14, typically performed with a merging block. In FIG. 3, a single cell preassembly is illustrated as being wound by a mandrel (not shown) on center core 24, to form a single spiral cell membrane. A cell fabrication apparatus that is typically located within a dryroom contains three reels of ribbon material to supply the positive electrode, negative electrode, and separator to the winder.

Figure 4:
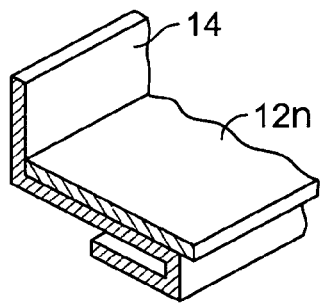
FIG. 4 is a cross-sectional view of the cell preassembly taken along line 4-4 of the process of FIG. 3.
Figure 5:
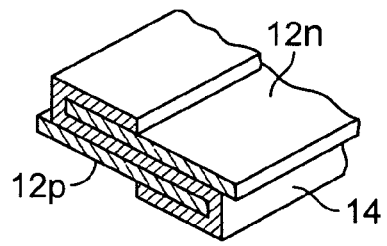
FIG. 5 is a cross-sectional view of the cell preassembly taken along line 5-5 of the process of FIG. 3.
Figure 6:
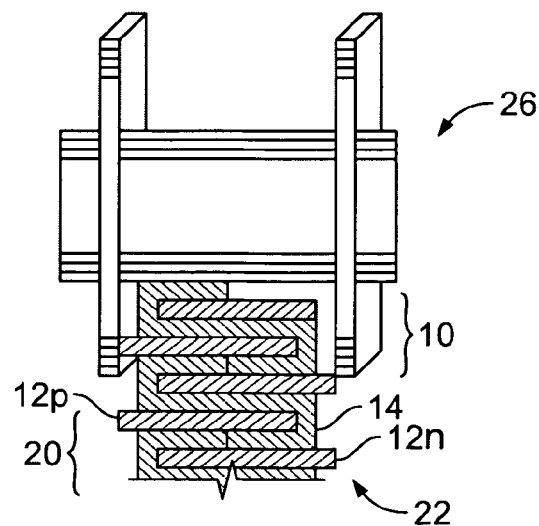
FIG. 6 is a cross-sectional view of the cell preassembly taken along line 6-6 of the process of FIG. 3.

FIG. 3 indicates operations 100, 102, 104, 106, and 108. As can be seen from FIGS. 3, 4, and 5, the electrodes 12p and 12n are folded into the separator 14 in successive operations 100, 102, 104, and 106. Preferably, the electrodes 12p and 12n extend about 0.5 mm beyond the edge of the separator layer. After the cell preassembly 10 is formed, the preassembly 10, in operation 108, is wound into a disc shape on underlying layers of itself as shown in FIG. 6. A liquid dispenser (and/or stylus) or an adhesive tape (not shown, but positioned between FIGS. 5 and 6) can glue (e.g. using an organic solution of polyvinylidene fluoride, e.g. KYNAR® 720) the edge 20 of the separator/electrolyte 14 to the edge 20 of the next successive separator layer to seal the separator/electrolyte elements of adjacent layers together to define a coiled cell membrane. Appropriate binders/sealant can likewise be applied to this layer interface by other means (not shown). The separator/electrolyte 14 seals with the underlying adjacent separator/electrolyte layer 14, and effectively closes the ends of the positive electrodes 12p, to have them open only to one side; whereas, the negative electrodes 12n open only to the opposing side.

In forming the electrode assembly 22 in the disclosed manner, the ribbon-like electrode elements and the separator/electrolyte element are pliant and generally composed of the specific active material of the electrodes or separator/electrolyte embedded in a polymer matrix. The coiled cell membrane of FIG. 2 can further be compressed slightly radially and axially, between rollers or the like (not shown), to establish and/or assure firm contact between the components of the cell preassembly and winding layers of adjacent cell preassemblies.

Preferably, the cell windings are tensioned during the fabrication process to maintain electrode/electrolyte(separator) interface for optimal performance. This configuration increases the acceptable choices for separator material and thickness. The separator can, for example, be painted on. The wound disc is generally physically confined at completion by a non-conductive outer ring, or bonding of the final wrap of the disc-shaped cell.

The core 24 can contain, or be substantially composed of, an electrical component for battery control. This electrical component removes the cell from operation when the cell becomes nonoperative, preferably by shorting the cell. A diode can effectively remove a failed cell from the operation of a battery stack or prevent overcharge from excessive charge voltage. A preferred diode is a Schottky, reverse-blocking, 0.8 V switching diode that serves as a low "dropout" for an integrated circuit bq24007 for battery charge control and is offered by Texas Instruments USA. This diode integrates a 1.2A-MOSFET and also provides charge-voltage limitations, e.g. 4.2 volts for eliminating over-charge damage. Electroactive polymers can be used similarity to shunt charge current at a set voltage. Embedding the diode within the cell makes control of the cell more direct. Alternatively, the center core 24 can be made of electrode material 12p or 12n or separator 14. The center core 24 may further form one component of the fastener discussed in more detail below.

According to FIGS. 3 and 6, a guide 26 is used to align the protruding electrode edges to form a flat disc. The guide can also serve to debur the electrode foil edge and can also be used to remove electrode coating from the very edge portion of the foil. This feature aids in minimizing the subsequent contact resistance between electrode and current collector. For designs with significant electrode protrusion (reserve capacity), the guide serves to bend/compact the electrode edges as the disc-shaped cell is wound. Preferably, the protruding electrodes are bent in the same direction to provide a common orientation. Although the preferred configuration of the separator 14 is Z-shaped, the separator 14 can encompass other embodiments envisioned by those skilled in the art as long as the separator adequately isolates the successive electrodes from one another in the completed device. For example, separator 14 can be configured in a U-shape wherein the electrodes 12p and 12n are placed within the fold of the U. Additionally, although the cell preassembly 10 shown in FIG. 1 has two electrodes 12p and 12n separated by one Z-shaped separator 14, the cell preassembly 10 is not limited to this configuration as will be readily understood by one skilled in the art. For example, the cell preassembly can have in excess of two electrodes 12p and 12n separated by the separator layer 14 by providing a wider separator layer 14 and providing more folds therein for receiving the electrodes 12p and 12n.

As the preferred embodiments electrochemical devices are related to the "jellyroll" configuration, the cell preassembly 10 can be layered or coiled on itself, such as into a spiral as shown for example in FIG. 2, with the negative electrode side 18n of one turn fitting closely against the separator or electrolyte side 18e of the adjacent turn to have the electrolyte side 18e facing out. The separator edges can form a butt-joint to separate the successive electrode layers. Preferably, the separator edges can overlap, be joined together with glue that is applied during the rolling operation, or both to ensure complete separation of the successive electrode layers. The sides 16p and 16n can be generally aligned, so that the coiled adjacent cell preassembly layers 10a, 10b, 10c, etc. in effect can form a laminate electrode assembly 22 extended in the direction generally transverse or even perpendicular to the elongated directions of the electrodes 12p and 12n. Although electrode assembly 22 as a disc is preferably made up of one long cell preassembly 10 coiled on itself, a plurality of cell preassemblies, for example, 2, 3, 4, 5, or more, can be coiled around a common central axis to form electrode assembly 22. Inner center core 24 of insulating material, separator, or electrolyte material can be used to start the coil so that the cell membrane can have no intermediate voids or gaps. As will be readily apparent to those skilled in the art, the electrode assembly 22 can have any desired thickness or diameter. Finally, a plastic ring or wrap of plastic 40 (not shown in FIG. 2) is used to keep the coil under rolled compression to prevent unwinding.

A suitable containment housing 28, such as that shown in FIG. 7A, is disposed around the electrode assembly 22, to isolate the positive and negative electrodes 12p and 12n electrically from each other thereby forming a cell 30. The housing 28 also serves to contain the electrode assembly 22 and seal the contents of the cell from the atmosphere. The housing 28 preferably contains an electrolyte which surrounds and contacts the electrode assembly 22. A preferred electrolyte is a Lithium salt, $LiPF_6$, dissolved in organic carbonates (e.g.EC:DEC 1:1, where EC:DEC is ethylene carbonate:diethyl carbonate) from EM Science, USA. Preferably, the electrolyte infiltration into the wound cell disc is performed in an inert atmosphere (e.g. a dryroom) and includes the use of vacuum to infiltrate the fine pore structures of the electrodes and separator with electrolyte. As can be seen in FIGS. 7A-7D, the housing includes two cups 28p and 28n joined together, and electrically isolated from each other with a gasket 32 located around the periphery of the cups 28p and 28n. Preferably, the "U" shaped gasket 32 is made of polyethylene.

At least a portion of the outward face of cups 28p and 28n is a terminal electrically coupled to only one of the electrodes of the electrode assembly 22. Preferably the entire cup 28p and 28n is a suitable material to serve as a terminal to increase electric conduction. The composition of the cups 28p and 28n can be any suitable material, but, preferably, the cups are made of a material that is compatible with the electrode materials 12p and 12n, and in particular the passive portion of the electrode. In an exemplary embodiment, the electrode foil substrate materials 12p and 12n are substantially the same composition as the cup materials 28p and 28n in order to minimize contact resistance between the electrodes 12p and 12n and the cups 28p and 28n, respectively. When the cell employs a lithium ion cell chemistry, the cup 28p that contacts the positive electrode 12p can be made of aluminum, and the cup 28n that contacts the negative electrode 12n can be made of copper. To increase durability in response to temperature change, the same metal substrate material can be used for cups 28p and 28n that comprise the positive and negative terminals. In an exemplary embodiment, the material can be carbon steel. Thus, in an exemplary embodiment, the positive electrode 12p and positive terminal surface of the cup 28p are made of aluminized carbon steel. In an exemplary embodiment, the negative electrode 12n and negative terminal surface of the cup 28n are made of copper plated carbon steel.

For a Ni/metal hydride battery, cups of Ni and stainless steel for corrosion stability can be selected. Metallized conductive polymer cups can be substituted for the metal parts to permit weight reduction for any of the cell chemistries. In other embodiments, the electrical conductivity of the disc-shaped cell enclosure could be made from conductive plastic because electrons need only pass through its thickness and it has a large area of contact, such as to the next cell in the stack.

Figure 9A:
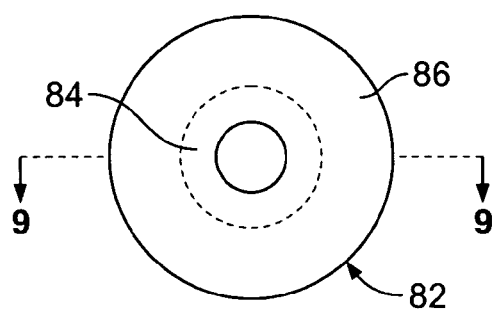
FIG. 9A depicts a radial view of the plastic tube portion of the fastener for the housing of the electrochemical device.
Figure 9B:
FIG. 9B depicts a cross-sectional view of a washer for attaching the fastener in accordance with an exemplary embodiment.
Figure 9C:
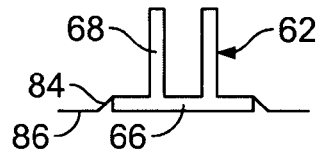
FIG. 9C depicts a cross sectional view of the plastic tube portion.

FIG. 8 shows the housing 28, in an exemplary embodiment that further comprises a fastener 60 on plate 70 that may also comprise the center core 24. FIGS. 9A-9C, in an exemplary embodiment, the fastener 60 includes a hollow tube 62 and a stem 64. Either of the hollow tube 62 or the stem 64 may comprise the center core 24. When second cup 28n is pushed together with first cup 28p, the stem 64 fits within the hollow tube 62. Second cup 28n includes a plate 70 and a wall 72. First cup 28p comprises a plate 74 and a wall 76. The stem 64 resists detachment from the hollow tube 62 thereby holding the first cup 28p together with the second cup 28n after the cups 28p and 28n are pushed together. The hollow tube 62 comprises a tube plate 66 and a cylindrical wall 68. In an exemplary embodiment, the tube plate 66 is molded to the plate 74 of the second cup 28n. In a specific embodiment, a plastic tube section can be molded into a center hole in the pan. The electrode assembly 22 encircles the fastener 60 when the cell is assembled in the manner related previously for the center core 24. As related previously, the fastener 60 may further comprise a diode 69 of FIG. 7D. The diode 69 has one lead attached to metal cup 28n piercing the base of plastic tube 68. The other lead pierces the metal cup 28p and may contact the stem 64. Thus, the two leads of the diode 69 electronically-bridge metal cups 28n and 28p when the two cups enclose the cell.

In an exemplary embodiment as depicted in FIGS. 9A-9C, the hollow tube 62 can be attached to the cup 28n by spot welding a washer 82 to the plate 70 of the cup 28n. A raised portion 84 of the washer 82 encompasses the tube plate 66 of the hollow tube 62 after sliding the cylindrical wall 68 through the washer 82. The washer 82 is welded or attached to the plate 70 along the washer surface 86. In exemplary embodiments, the washer 82 can be made of metal material to allow welding of the washer surface 86 to the cup 28n. In exemplary embodiments, the stem 64 is made of conducting material such as metal that is welded to the plate 74 of the cup 28p and is threaded, or has a flange, to further resist detachment and movement along the cylindrical wall 68 of the hollow tube 62. In alternative embodiments, the interior surface of the wall 64 includes a thread that cooperates with the thread of the stem 64. In exemplary embodiments, the hollow tube 62 is made of insulating material such as plastic. The hollow tube 62 may alternatively be attached to the cup 28p and the stem may be attached to the cup 28n.

In an alternative embodiment with insert molded plastic parts, the fastener 60 comprises a tube 80 that fits into a grommet 78. As shown in FIG. 10A, the tube 80 replaces the stem 64 and the hollow tube 62 has an open bottom to become a grommet 78. FIGS. 10A-10C show a cross section of the disc-shaped cell housing with tube 80 through grommet 78 acting as center connectors. Tube 80 extends beyond the grommet 78 as shown in the fastener detail. In exemplary embodiments, the tube 80 and the grommet 78 are made of insulating material such as plastic that is insert molded to the metal cups 28n and 28p. Tube 80 also can have a radial hole 90 to the inside of the cell that can be used to infuse the cell with electrolyte and to provide an outlet for degassing during the first electrical charge of the cell as related previously. After the degassing, the cell can be sealed by melting the tube 80 into the grommet 78. The cutaway view of the disc-shaped cell housing shown in FIG. 8 depicts the center fastener 60 after the tube 80 has been thermal welded to grommet 78 and sealed. A person skilled in that art will readily recognize that additional fastener components and/or sealing configurations are possible.

Figure 11:
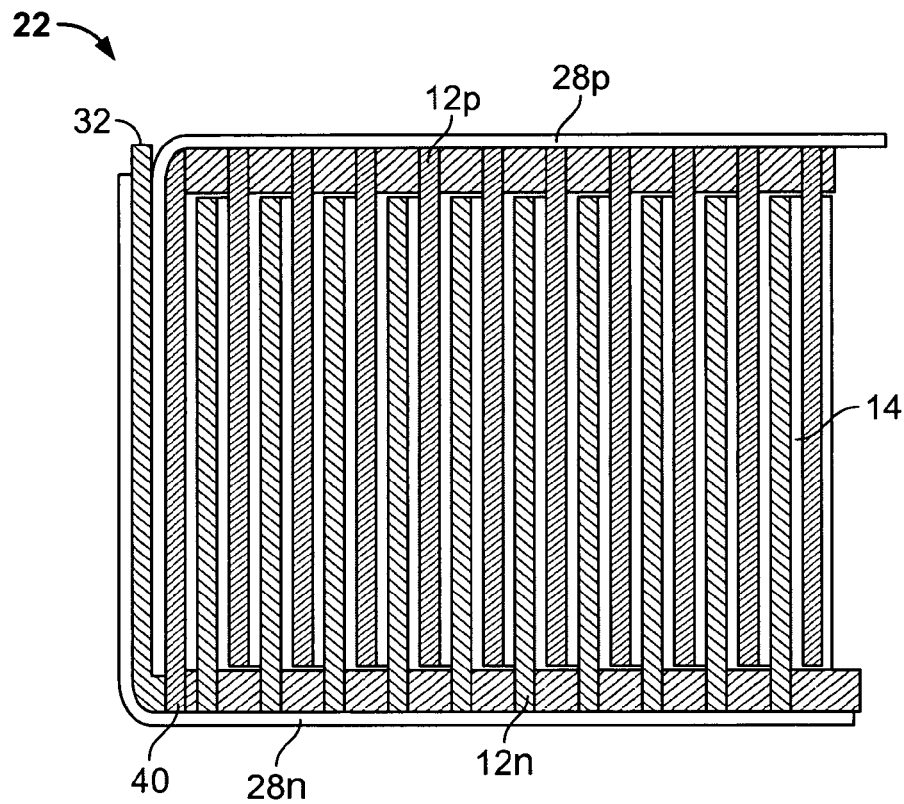
FIG. 11 is a radial edge section of a bipolar electrochemical device incorporating the electrode assembly in accordance with an exemplary embodiment.

FIG. 11 illustrates positive and negative electrodes 12p and 12n that have surface configurations generally opposed to one another and extend in axial directions primarily transverse to the paired current collectors, and the separator/electrolyte 14 follows a serpentine configuration having portions generally elongated in the axial direction transverse to the paired current collectors. The electrodes thus overlap primarily along regions that are generally thin and ribbon-like, flattened, and extended in the axial direction generally normal to the sides 16p and 16n of the preassembly, or to the electrode assembly 22. The positive and negative electrodes 12p and 12n are alternately arranged across the cell membrane, and respectively are electrically common with only one of the terminals of the paired cups 28p and 28n.

The cell configuration shown in FIG. 11 offers interfacial area (similar to that identified as "A" in the above algorithm) between the adjacent positive and negative electrodes that is comprised of: (1) the transverse regions between the closed end of each electrode and the opposite polarity electrode material layer; and (2) the overlapping axial regions between the opposed electrodes of each cell preassembly and adjacent cell preassembly. The total interfacial area contributed by the transverse regions (1) of the electrodes will be the overall transverse planar area of the cell or approximate facial area of a cell terminal, a fixed amount, reduced by the approximate total area of either the positive or negative electrodes. On the other hand, the total interfacial area contributed by the axial regions (2) can be a significantly higher multiple, depending only on the electrode proportions. In a typical preferred preassembly 10, the opposing sides 16p and 16n, can be spaced apart by a width less than 9 mm and the opposing sides 18e and 18n can be spaced apart by a height between 0.1-1.0 mm. As the preassembly height is comprised of the thickness of both electrodes and twice the thickness of the separator/electrolyte, the individual thickness of these components can be less than 0.1 mm. The preferred width-to-height ratio of a cell preassembly more specifically will be between being approximately square and being very flattened (at ratios such as between 1-to-1 and 50-to-1).

The total interfacial area contributed by the axially overlapped electrode regions can thus be made one hundred times the total interfacial area contributed by 5 transverse regions, and accordingly, this cell configuration can provide one hundred times more electrode interface area than the simple area of adjacent planar current collector. When in a preferred cell, the approximate thickness of a electrode assembly 22 can be very small, such as 9 mm or less, while the thickness of the separator/electrolyte interposed between the electrodes is likewise very small, such as less than 0.1 mm.

In some embodiments, the cell's disc shape is important to achieve high power and excellent internal heat rejection. This is especially true as discs can be stacked together to form a battery. The relative disc dimensions are cell radius to cell thickness ratio of 10:1, cell size ranges of 21 mm thick by 220 mm radius to 2 mm thick by 15 mm radius are preferred. A typical cell can be 6.5 mm thick by 65 mm radius.

Figure 12A:
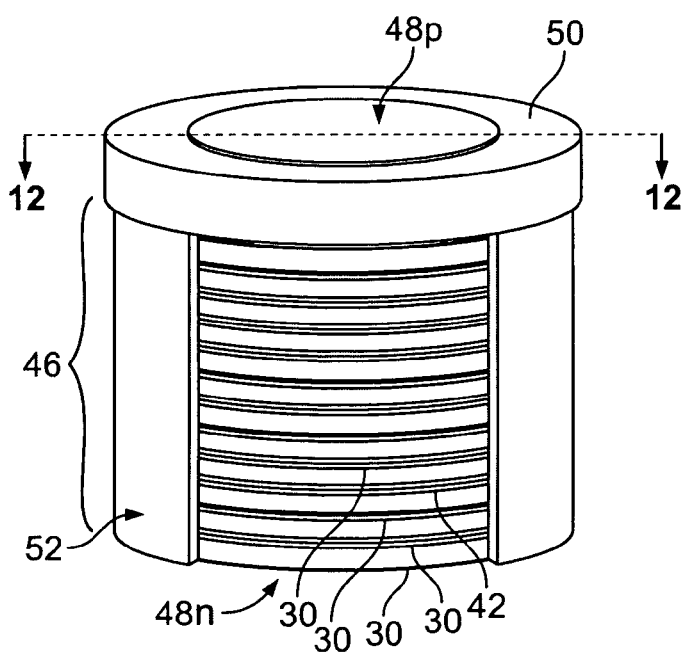
FIG. 12A shows a high voltage battery made up by stacking disc-shaped electrochemical cells in accordance with an exemplary embodiment.
Figure 12B:
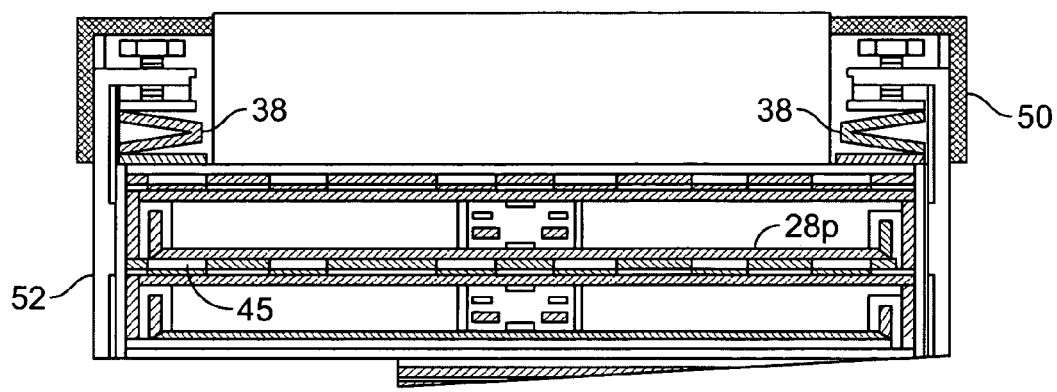
FIG. 12B shows an end cross-sectional view.
Figure 12C:
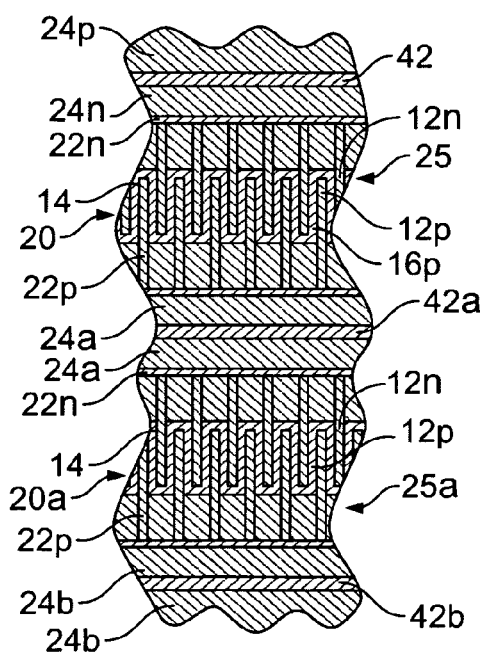
FIG. 12C shows a detailed cross-sectional view of the high voltage battery, taken along line 12-12.

As in FIGS. 12A-12C, cells 30 which include the housing 28 are preferably stacked together with intervening coolant channels 42 and are contained within a larger housing 52 having spring compression from an end plate 50. The disc-shape is also important to the passive thermal management of the cell which provides an inherent safety feature. The cell housing can act as a heat sink for internally generated heat. In sustained high power discharge (500 W/kg), there is less than a 10° C. rise in cell temperature, and, under the most severe high pulse power demand, within the cell there is less than a 2° C. temperature rise. This degree of cell temperature control indicates passive thermal management and inherent safety for high power applications. Notably, cooling fluid is not a requirement for operation of the present cells, either when used singulary or plurally under normal, pulsed, or high power discharge conditions, although in some designs it may be desirable to provide active cooling as is found in other devices.

As in FIG. 12A, each cell 30, etc. is substantially sealed, by the electrically conductive cup-like forms 28p and 28n disposed around the periphery of the positive and negative electrode material layers 12p and 12n of the cells, by a plastic insulator ring 40 around the periphery of the cell preassembly 10 and interposed between the forms 28p and 28n, and by a "U" shaped insulator/gasket 32. Each of the cells is sealed in a housing 28, having inner and outer rims separated by gasket 32. The gasket 32, usually polyethylene, can also be an adhesive polymer, such as Dupont Surlyn, to seal the cell without pressure-loading where a pressure-release seal is not required.

As seen in partial cross-section FIGS. 12B-12C, each cell 30 may have coolant channels 42 in the housing 28. Alternatively coolant channels 42 can be provided by placing a corrugated material 45 sandwiched between the housings 28 of adjacent cells. Thermal/electrical conductivity is maintained between housing 28 and coolant channel 42 by conductive paste or spotwelds when the cooling channel is formed of corrugated material 45.

Each unitary cell preassembly 10 and sandwiching layers 12n and 12p of electrode material and cups 28p and 28n thus comprise a completed cell 30 of the electrochemical device. In each cell, the open end of each respective electrode 12p and 12n is electrically common with cups 28p and 28n, respectively. Alternatively, a piece of conductive material can be interposed between the electrodes 12p and 12n and cups 28p and 28n. The cell preassembly 10 crosses the cell 30, in a generally radial direction, substantially parallel to the cups 28p and 28n and the separator or electrolyte 14 therein assumes a serpentine configuration flattened to extend primarily in the axial direction and transverse to the current collectors and comprised mostly of portions disposed generally axially and of smaller portions disposed radially.

Many individual unitary cells 30 are provided to make up a preferred electrochemical device 46 as illustrated in FIG. 12A. The cells provide a cumulative cell voltage output and a common current output. The illustrated cups 28p and 28n are bipolar in nature, each having its opposite face contacting the positive and negative electrodes 12p or 12n of the adjacent cells. The endmost cups 28p' and 28n' contact terminals 48p and 48n to provide for external connection of the electrochemical device to exterior devices. It is not required that electrochemical device 46 be made up of a plurality of cells 30, with each having individual housings 28. Alternatively, each electrode assembly 22 can be separated from the adjacent electrode assembly by any suitable current collector, with 22n being the negative face of assemble 22 and 22p being the positive face of assembly 22. Effectively, the current collector would thus take the place of and perform substantially the same function as cups 28p and 28n of the housing 28.

Usable work in the electrochemical device 30 illustrated in FIG. 12C occurs when ions are transferred between the positive and negative electrodes 12p and 12n via the separator/electrolyte 14, and concurrently when electrons are passed via the electrodes and the adjacent electrode material layers between the terminals of the cups 28p and 28n. In a preferred embodiment, both low resistance electron and heat transfer from electrode to terminal occurs by having electrode substrate and terminal cup surfaces being of the same material. Alternatively, cups 28p and 28n could be spotwelded together with coolant channel 42 to sequentially assemble an electrochemical device with electrode assembly 22 inside each cell housing 30.

The majority of electron transfer takes place in the axial direction along the flattened electrodes and the adjacent electrode material layers or normal to the current collectors. As noted above, the positive and negative electrodes 12p and 12n are electrically continuous at opposite open ends thereof respectively with the positive and negative material layers 28p and 28n of each cell. Resistance to electron passage via the electrodes will generally be negligible compared to ionic resistance. The sandwiching electrode material layers 12p and 12n can be made with thicknesses to suit the purpose of the electrochemical device where the thicker presence adds to the capacity of the electrochemical device.

The electron passage through the terminal of the cups 28p and 28n is in the axial direction transverse thereto, so these components can be of thin, lightweight electrically conductive construction. Internal resistance due to the current collectors will also be negligible compared to ionic resistance. The greater concern is electrode contact onto the face of the current collector. Facial conductivity can be preserved or enhanced with a non-oxidizing conductive paste, e.g. NoAlox (Ideal Industries, Sycamore Ill.).

The majority of ion transfer will take place via the interfacial area "A" between the axially extended adjacent overlapping paired electrodes 12p and 12n, in a radial direction and substantially parallel to the terminal of the cups 28p and 28n. Some ion transfer will take place also axially between the closed ends of the electrodes and the adjacent opposite electrode layers. The large interfacial electrode area "A", compared to the cross-section of the cell, reduces internal resistance against ion transfer in the electrochemical device.

Another advantage of the disclosed cell orientation relates to its durability, and thereby allows the separator/electrolyte 14 to be made with a very small thickness "I", for further reducing the ion resistance. This is possible in part because the overall length of overlapping electrodes in the cell preassembly 10 is small, for example, less than 10 mm, whereby the separator/electrolyte 14 need structurally separate the electrodes across only these short overlapping lengths. This is possible also because the cell preassembly 10 is initially fabricated and then coiled into the electrode assembly 22, or the cell preassembly 10 is fabricated on and as part of forming the electrode assembly 22. Moreover, the short electronic current flow paths along the lengths of the electrodes (less than 10 mm) do not require a highly conductive electrode current collector supplementing or paralleling the electrodes, allowing the electrode structures and the separator/electrolyte 14 to be made of substantially uniform thickness.

The disclosed electrochemical device configuration of FIG. 12A minimizes the mechanical load the separator/electrolyte 14 supports during the cell formation and thereafter during normal usage; and moreover provides very high specific output energy and specific output power compared to known electrochemical devices.

As in FIGS. 12A-12C, a battery of rolled-ribbon cells consists of cells stacked to build voltage. For illustration purposes, the positive cell terminal is on the top 48p and negative cell terminal 48n is on the bottom, the top of the stack is the positive battery terminal, and the bottom is the negative battery terminal. Provision for cooling between cells 30 is provided by coolant channels 42, for example grooves, on the face of either or both cups 28p and 28n, or a separate piece 45 of corrugated material or metal (e.g. aluminum) between the cells in the stack. The entire stack is preferably held together under compression using pieces of resilient material 38, such as individual springs or a Belleville spring washer, within the end restraining plates 50 and/or peripheral brackets 52 of the electrochemical device 46. The spring 38 at the end of the stack serves to apply pressure at the electrode/current collector cup interface as well as to the cell-to-cell surfaces thereby virtually eliminating contact resistance. Contact resistance for the present configuration has been measured at 5-10 micro-ohms for a 125 mm diameter cell under the pressure discussed below. Cell resistance is typically 5-10 milliohms for a 125 mm diameter cell. A second function of the end spring is to regulate the greatest allowable internal cell pressure. For example, a spring compressed at 200-400 lbs used with cell cups 28p and 28n having 20 $in^2$ facial area would maintain 10 psi on all the cells in the stack. If a single cell produced internal pressure exceeding the 10-20 psi limit, the end spring would slightly compress and the peripheral gasket of the over pressurized cell would subsequently relax to relieve the overpressure. This cell would then reseal itself under the spring force. Pressure build up is a safety concern and is not anticipated for properly functioning cells. The stack arrangement also provides for channeling of coolant, such as a silicone dielectric transformer fluid 561 (Dow, USA) from the periphery of one side of the cell stack, between the cell disks in the stack, to the opposite periphery of the cell stack. Alternatively, the present cells, when in operation, can rely solely on passive cooling without resort to more expensive active cooling measures. The stack temperature can be maintained at 10° C. and rise no more than 10° C. at any point within the stack, even under extreme power demand. It will be readily apparent to one skilled in the art that the force applied to the cups $28p$ and $28n$ of the housing 28 can be of any desired strength. Preferred pressures applied by the resilient member 38 can vary greatly, such as in the range of 5 psi to 30 psi, depending upon cell usage.

Figure 13A:
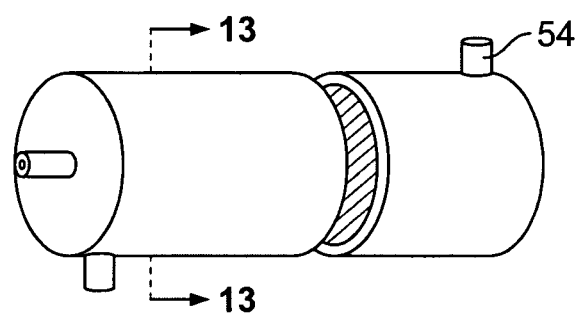
FIG. 13A depicts an embodiment that can achieve greater cooling of the electrochemical cells.
Figure 13B:
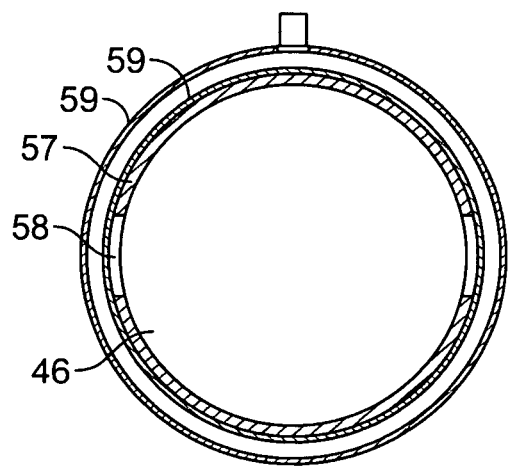
FIG. 13B shows a cross-sectional view of a battery housing with cooling jacket.

FIGS. 13A-13B give further detail in describing the arrangement of cell stack and coolant flow. A polymer jacket creating a 1 mm annulus encapsulates the cell stack with dielectric fluid. Multiple electrochemical devices 46, e.g. batteries, may be contained within the polymer jacket. The jacket has an inlet 54 to an inlet manifold and an outlet 56 from an outlet manifold for circulating coolant 57 and thereby removing heat to an outside refrigeration or radiator system. The ends provide access for the battery terminals (e.g. "O" ring seals). As in section 13-13 of FIG. 13A, the inlet and outlet manifolds are separated by means of a manifold seal 58, and the coolant 57 is directed from the periphery of one side of the cell stack through channels between the cells to the opposite stack periphery. This arrangement, in conjunction with the excellent heat removal from the rolled-ribbon cell internals, is capable of temperature control, usually within a few degrees centigrade during typical pulse demand from the battery. To further assure precise temperature control of the cells, the manifolds could be encased in an insulating jacket 59.

Figure 14:
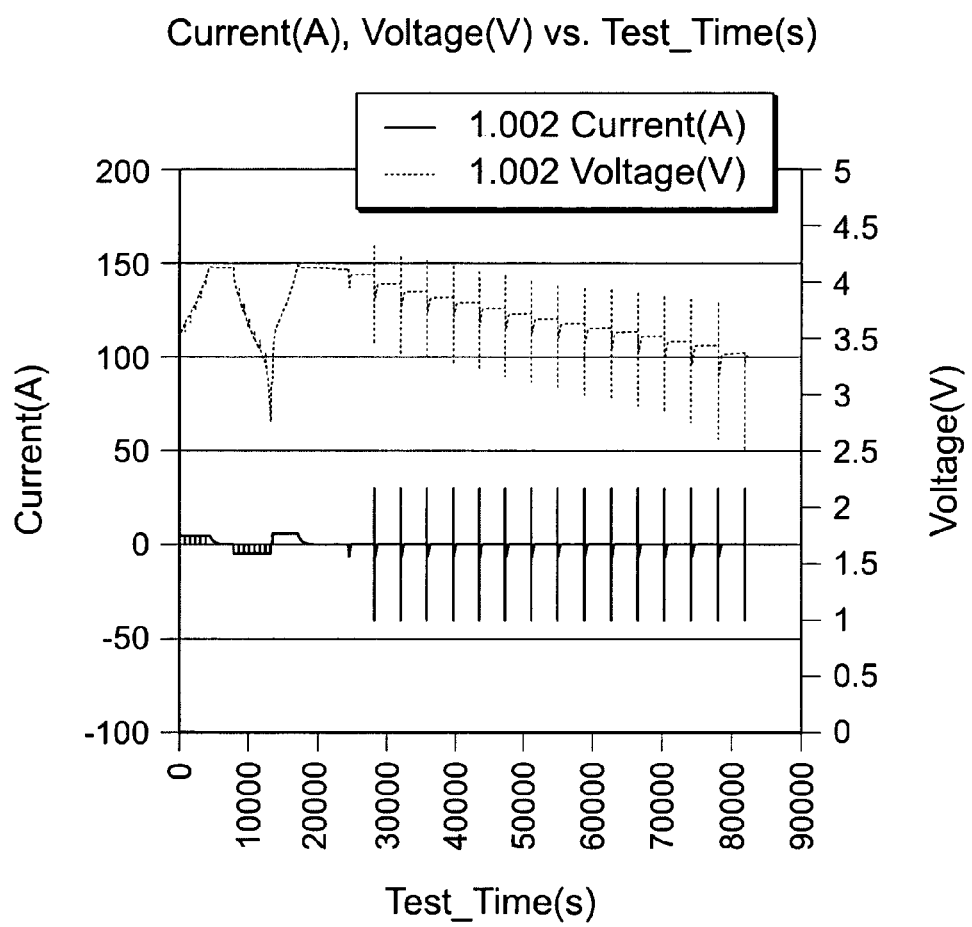
FIG. 14 depicts a current vs. time profile and voltage vs. time profile for a cell under a compressive load.
Figure 15:
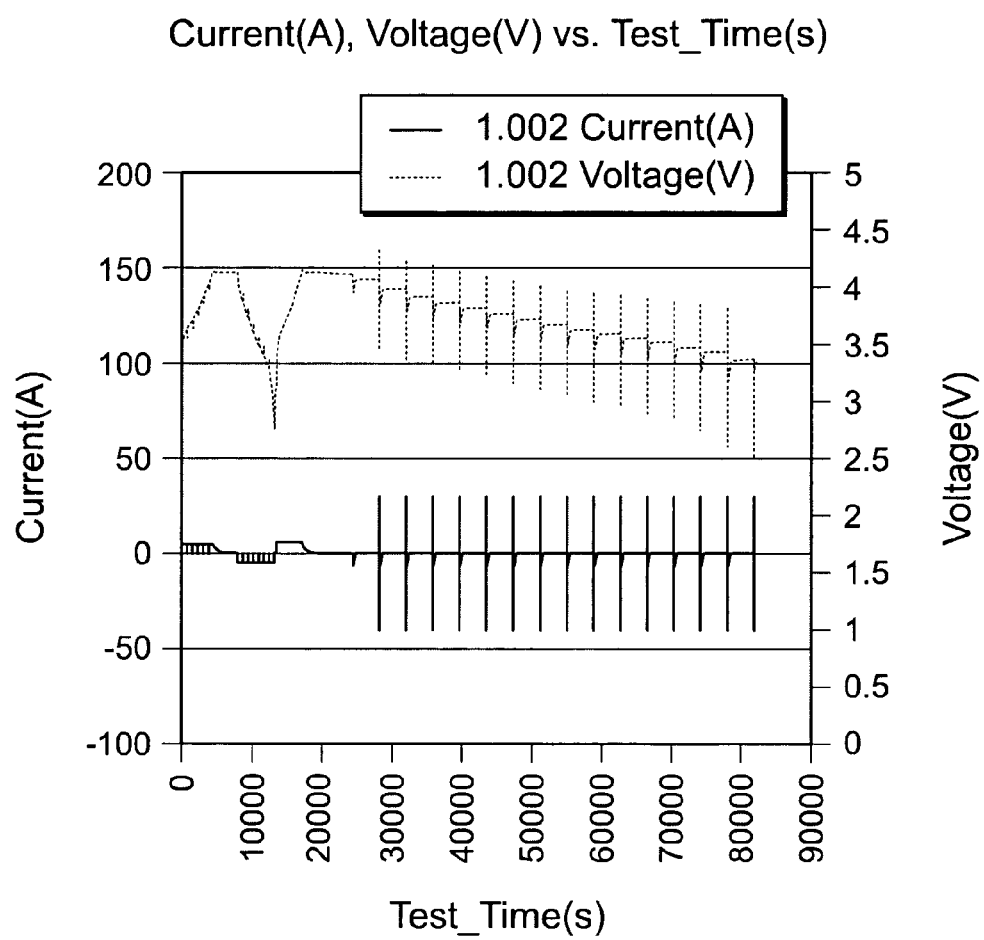
FIG. 15 depicts a current vs. time profile and voltage vs. time profile for a cell in accordance with an exemplary embodiment wherein the cell is not under a compressive load.

The cell with a center fastener 60 retains cell performance even in the absence of the applied pressure discussed relative to FIGS. 7A-7D and 10A-10C. FIG. 14 depicts the voltage and current performance when the cell is under a compressive load with the springs, as related previously, fully engaged. FIG. 15 depicts the voltage and current performance when the cell is not under a compressive load, but the housing includes a fastener 60. Both the cell's capacity (the first constant current discharge cycle to about 15000 s) and power performance (the second discharge cycle with power pulses, as in a high pulse power cycle test) are directly comparable. Only the voltage drop from the 40 A discharge pulse is slightly greater in FIG. 15 where no external pressure was applied to the cell housing.

By way of summary of this invention, the electrodes overlap and oppose one another over the major portion of the axial thickness of the laminate cell membrane disc, over all but approximately twice the thickness of the separator/electrolyte, which in cross-section zig-zags in a serpentine manner between the electrodes. The positive and negative electrodes are alternatively arranged whereby each is electrically common with only one of the paired current collectors respectively and is extended primarily transverse or even perpendicular thereto.

The component layers of the disclosed cell preassembly can be of very thin ribbon-like cross-sections, less than 1 mm and more typically between 0.01-0.5 mm thick. The electrodes can oppose and overlie one another over small lengths, more typically between 1-25 mm, and the formed cell preassembly and coiled cell membrane are quite narrow, typically less than 10 mm. The opposing electrodes thus overlie one another over lengths at least several times, and up to approximately 500 times, the thickness of the separator/electrolyte interposed therebetween.

The disclosed rolled-ribbon cell membrane configurations provide interfacial area "A" between the adjacent positive and negative electrodes, far greater by an enhanced area ratio "EAR" than the planar area of either adjacent current collector.

Using the cell preassembly height "h" and width "w" dimensions, a formulation for the enhanced area ratio can be represented as EAR=2 w/h; whereby a cell preassembly having a width "w" of 4-8 mm and a height "h" of 0.2 mm can provide an enhanced area ratio "EAR" of approximately 40-80. By contrast, attempts to overlap electrodes by using corrugations can provide a maximum "EAR" of approximately 2, due in part to fabrication limitations including the allowable minimum thickness of the component layers and the consequential tearing of thin layers at the corners. Electrochemical devices formed with rolled-ribbon cell membranes configured according to exemplary embodiments thus generate significant outputs, compared to a given cell cross-section using existing technologies.

The present methods can involve any or all of the steps or conditions discussed above in various combinations as desired. Accordingly, it will be readily apparent to those skilled in the art that, in some of the disclosed methods, certain steps can be deleted or additional steps performed without affecting the viability of the methods. Additionally, any suitable embodiment, or portion thereof, disclosed herein can be used with any suitable embodiment, or portion thereof.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the embodiments encompass not only the main group, but also the main group absent one or more of the group members. The embodiments also envisage the explicit exclusion of one or more of any of the group members. As used herein "a" or "an" means "one" or "one or more."

All references disclosed herein are specifically incorporated by reference thereto.

While preferred embodiments have been illustrated and described, it should be understood that changes and modifications can be made therein in accordance with ordinary skill in the art without departing from the invention in its broader aspects as defined in the following claims.

What is claimed is:
1. A housing for an electrochemical device comprising a plurality of electrodes, the housing comprising:
    (a) a first cup, the first cup defining
        (1) a first flat surface having a circumferential edge; and
        (2) a first wall, the first wall extending from the first flat surface along the circumferential edge;

(b) a second cup, not identical to the first cup, the second cup defining
  (1) a second flat surface having a circumferential edge; and
  (2) a second wall, the second wall extending from the second flat surface along the circumferential edge, wherein the first cup and the second cup combine to form a disc-shaped enclosure, wherein the enclosure seals the electrodes from an ambient atmosphere; and
(c) a fastener, wherein the fastener attaches the first cup to the second cup and the fastener is located between the first flat surface of the first cup and second flat surface of the second cup at the center of each cup, wherein the fastener extends in the same direction as the first and second walls, and wherein the plurality of electrodes encircles the fastener.

2. The housing of claim 1, wherein the fastener comprises:
(a) one or more stems; and
(b) one or more tubes, wherein the one or more stems fit inside one or more of the one or more tubes.

3. The housing of claim 2, wherein one or more of the one or more tubes and the one or more stems at least partially comprises an insulating material.

4. The housing of claim 3, wherein the insulating material comprises a plastic material.

5. The housing of claim 2, wherein one or more of the one or more tubes and the one or more stems at least partially comprises a conducting material.

6. The housing of claim 5, wherein the conducting material comprises a metal.

7. The housing of claim 2 wherein one or more of the one or more stems and the one or more tubes is threaded.

8. The housing of claim 1, wherein the fastener comprises:
(a) a grommet, and
(b) a tube, wherein the tube fits inside the grommet and is attached thereto.

9. The housing of claim 8, wherein one or more of the grommet and the tube is at least partially comprised of an insulating material.

10. The housing of claim 9, wherein the insulating material comprises a polymeric material.

11. The housing of claim 8, wherein one or more of the grommet and the tube is at least partially comprised of a conducting material.

12. The housing of claim 11, wherein the conducting material comprises a metal.

13. The housing of claim 8 wherein the tube is hollow and includes a side channel to an interior of the electrochemical device, thereby allowing gases to escape.

14. The housing of claim 11, wherein one or more of the tube and the grommet is threaded.

15. The housing of claim 11, further comprising a gasket wherein the gasket electrically isolates the upper cup from the lower cup.

16. The housing of claim 15, wherein the gasket comprises a polymeric material.

17. The housing of claim 15, wherein the gasket fits over one or more of the wall of the first cup and the wall of the second cup.

18. The housing of claim 1, wherein the first cup and the second cup comprise a coated material.

19. The housing of claim 1, further comprising:
(a) an electrode assembly comprising:
  (i) a positive electrode layer wherein the positive electrode layer is electrically coupled to one of the first cup and the second cup;
  (ii) a negative electrode layer wherein the negative electrode layer is electrically coupled to the other of the first cup or the second cup; and
  (iii) a separation layer, wherein the positive electrode layer, the separation layer, and the negative electrode layer are wound around a central axis forming a coil of alternating electrode and separation layers such that the separation layer prevents direct contact between the positive electrode layer and the negative electrode layer; and
(b) an electrolyte adjacent to the electrode assembly and enclosed within the enclosure.

20. The housing of claim 11, further comprising:
(a) an electrode assembly comprising:
  (i) a positive electrode layer wherein the positive electrode layer is electrically coupled to one of the first cup and the second cup;
  (ii) a negative electrode layer wherein the negative electrode layer is electrically coupled to the other of the first cup or the second cup; and
  (iii) a separation layer, wherein the positive electrode layer, the separation layer, and the negative electrode layer are wound around a central axis forming a coil of alternating electrode and separation layers such that the separation layer prevents direct contact between the positive electrode layer and the negative electrode layer; and
(b) an electrolyte adjacent to the electrode assembly and enclosed within the enclosure.

21. The housing of claim 1, further comprising a gasket wherein the gasket electrically isolates the first cup from the second cup.

22. The housing of claim 21, wherein the gasket comprises a polymeric material.

23. The housing of claim 21, wherein the gasket fits over the first wall.

24. The housing as recited in claim 19 wherein the positive electrode layer extends perpendicular to the interior surface of one of the first cup and the second cup and beyond the separation layer and the negative electrode layer extends perpendicular to the interior surface of the other of the first cup and the second cup.

25. The housing as recited in claim 24 wherein the positive electrode layer extending beyond the separation layer is compacted against the inside surface of one of the first cup and the second cup and the negative electrode layer extending beyond the separation layer is compacted against the inside surface of the other of the first cup and second cup.

26. A housing for an electrochemical device comprising a plurality of electrodes, the housing comprising:
(a) a first cup, the first cup defining
  (1) a first flat surface having a circumferential edge, wherein the first flat surface is a heat sink; and
  (2) a first wall, the first wall extending from the first flat surface along the circumferential edge;
(b) a second cup, not identical to the first cup, the second cup defining
  (1) a second flat surface having a circumferential edge, wherein the second flat surface is a heat sink; and
  (2) a second wall, the second wall extending from the second flat surface along the circumferential edge, wherein the first cup and the second cup combine to form a disc-shaped enclosure, wherein the enclosure seals the electrodes from an ambient atmosphere;
(c) a fastener, wherein the fastener attaches the first cup to the second cup and the fastener is located at the center of each cup, and wherein the fastener extends in the same direction as the circumferential edge;

(d) an electrode assembly comprising:
  (1) a positive electrode layer wherein the positive electrode layer is electrically coupled to one of the first cup and the second cup;
  (2) a negative electrode layer wherein the negative electrode layer is electrically coupled to the other of the first cup or the second cup; and
  (3) a separation layer, wherein the positive electrode layer, the separation layer, and the negative electrode layer are wound around a central axis forming a coil of alternating electrode and separation layers such that the separation layer prevents direct contact between the positive electrode layer and the negative electrode layer, wherein the positive electrode layer extends perpendicular to the interior surface of one of the first cup and the second cup and beyond the separation layer and is compacted against the inside surface of one of the first cup and the second cup, and wherein the negative electrode layer extends perpendicular to the interior surface of the other of the first cup and the second cup and is compacted against the inside surface of the other of the first cup and second cup; and
(e) an electrolyte adjacent to the electrode assembly and enclosed within the enclosure.

27. The housing as recited in claim 2 wherein the tube defines a hole to the inside of the housing to infuse the housing with electrolyte and to provide an outlet for outgassing.

28. The housing as recited in claim 1 wherein the fastener is an electrolyte fill port.

29. The housing of claim 23, wherein the gasket forms a gas tight seal for the interior contents of the housing.

* * * * *